United States Patent [19]

Nemoto et al.

[11] 3,873,045

[45] Mar. 25, 1975

[54] TAPE CASSETTE

[75] Inventors: Tsuneo Nemoto; Kiyoshi Urayama, both of Miyagi-ken, Japan

[73] Assignee: Sony Corporation, Tokyo, Japan

[22] Filed: July 19, 1973

[21] Appl. No.: 380,883

[30] Foreign Application Priority Data

July 25, 1972 Japan .............................. 47-87670

[52] U.S. Cl. ................................ 242/199, 242/75.3

[51] Int. Cl. .......................................... G11b 23/10

[58] Field of Search ........... 242/199, 200, 198, 189, 242/75.3, 71.2, 71.1, 76; 512/72, 78

[56] References Cited

UNITED STATES PATENTS

| | | | |
|---|---|---|---|
| 2,159,998 | 5/1939 | Morsbach et al. ................. | 242/71.2 |
| 2,568,339 | 9/1951 | Jacobson ........................ | 242/200 X |

*Primary Examiner*—George F. Mautz

*Attorney, Agent, or Firm*—Lewis H. Eslinger; Alvin Sinderbrand

[57] ABSTRACT

In a cassette for use in a magnetic recording and/or reproducing apparatus, a housing contains rotatable reels on which a resiliently flexible tape is wound and the housing has an access opening extending along a side thereof through which the tape can be withdrawn for the recording and reproducing of signals thereon, guide members within the housing adjacent the opposite ends of the opening direct the tape between the reels in a path including a run extending along the opening and path portions extending from adjacent the ends of such opening tangentially to the outer turns of said tape wound on the respective reels, and at least one tape shifting member acts against a face of said tape in a respective one of the path portions. Each tape shifting member is mounted for movement in a course spaced from the adjacent guide member and is resiliently urged to a normal position in which the tape shifting member produces a bend in the related path portion between the respective guide member and reel so that turning of that reel in the tape unwinding direction enlarges the tape bend due to the resilient flexibility of the tape and transmission of the resulting slack in the tape to the tape run across the access opening is avoided. The tape shifting member is deflected from its normal position by the tape in response to a substantial tension in the latter for removing the bend from the respective path portion.

7 Claims, 10 Drawing Figures

TAPE CASSETTE

BACKGROUND OF THE INVENTION

1. Field of the Invention

This invention relates generally to tape cassettes for use in magnetic recording and/or reproducing apparatus, and more particularly is directed to improvements in tape cassettes of the type in which the tape is wound on, and is guided between freely rotatable reels in the cassette housing so that a run of the tape traverses a cutout or opening provided in the housing for access to the tape.

2. Description of the Prior Art

When a tape cassette of the described type is installed in a magnetic recording and/or reproducing apparatus, a part of the latter extends into the opening of the cassette housing for engagement with the magnetic tape exposed at such opening. For example, in the case of apparatus for magnetically recording and/or reproducing video signals on a magnetic tape supplied within a cassette, the recording and reproducing of signals on the tape is frequently effected by a rotary magnetic head which scans skewed record tracks on the tape as the latter is guided about the periphery of a clindrical guide drum which substantially coincides with the circular path of the rotary head and which is located apart from the cassette housing. Thus, in such case, it is necessary to withdraw the magnetic tape from within the cassette housing and to wrap or load the withdrawn tape about at least a portion of the periphery of the guide drum. Although such loading of the tape on the guide drum was originally manually effected, automatic devices have been provided, for example, as disclosed in U.S. Patent Application Ser. No. 113,988, filed Feb. 9, 1971 now abandoned, and having a common assignee herewith. With the identified automatic loading device, upon the installation of the tape cassette in the recording and/or reproducing apparatus, a tape engaging member of the automatic loading device extends into the opening of the cassette housing for engagement with the tape, whereupon the tape engaging member is actuated or moved in a path that extends out of the cassette housing for withdrawing the tape from the latter and wrapping or loading the tape on the guide drum. It is essential for the proper operation of such automatic loading device that excessive looseness or slackness in the run of the tape that extends across the opening of the cassette housing be avoided when the cassette is installed in the recording and/or reproducing apparatus. In such run of the tape is excessively loose or slack and thus does not follow a substantially straight path between guides provided within the cassette housing at opposite ends of the opening of the latter, then the tape may not be properly engaged by the tape engaging member of the tape loading device which may lead to either damage to the tape or defective recording or reproducing operations.

The possibility of excessive looseness or slackness of the tape, particularly at the run thereof which extends across the opening of the cassette housing, arises by reason of the fact that the reels on which the tape is wound are loosely or freely rotatable within the cassette housing. Thus, when the cassette is being transported or is otherwise apart from the recording and/or reproducing apparatus with which it is intended to be used, one or both of the reels within the cassette housing may turn in the direction for unwinding of the tape therefrom to develop slack in the tape extending between the reels, and particularly in the run of the tape extending across the opening of the cassette housing.

It has been proposed in U.S. Pat. No. 2,894,700, to provide a tape cassette or magazine with brakes for holding taut or preventing undue slackness in the run of the tape which extends across an access window or windows provided in the cassette housing between spaced apart guide members therein. Such previously proposed brakes were constituted by leaf-spring arms each secured, at one end, within the cassette housing and carrying a felt pad at its other end urged against a respective one of the guide members or pins with the tape therebetween for frictionally resisting movement of the tape relative to the respective guide member. With the described brakes, the recording and/or reproducing apparatus with which the cassette is intended to be used has to be provided with fixed brake releasing pins which, upon installation of the cassette or magazine, extend through slots in the cassette housing and engage the leaf-spring arms for deflecting the latter and thereby moving the respective felt pads away from the adjacent guide pins so that the tape may be freely driven during recording and reproducing operations, for example, by means of a rotated capstan and pinch roller engaged with the tape and/or by means of the rotary drive of one or the other of the tape reels. However, the need for providing the recording and/or reproducing apparatus with brake releasing members by which the brakes in the cassette are released upon the installation of the tape cassette or magazine undesirably complicates such apparatus.

It has been similarly proposed in U.S. Pat. No. 3,282,523 to provide frictional braking members which engage the tape against respective guide members or pins within the cassette housing. Such frictional braking members are intended to remain engaged with the tape against the respective guide pins so as to provide an unrelieved frictional resistance to movement of the tape during recording and reproducing operations.

In U.S. Pat. No. 3,096,038, it is disclosed that at least one of the idler rollers leading the tape from one to the other of the reels is supported on a pivoted lever which is spring-urged against a stop. During operation, the spring-urged lever is displaced away from its stop in response to suddenly increased tension in the tape to avoid damage to the tape. However, if the foregoing arrangement was incorporated in a cassette in which the reels are freely rotatable upon removal of the cassette from a recording and/or reproducing apparatus, the spring-urged lever would merely move against its stop upon the initiation of the turning of one of the reels in its tape unwinding direction and thereafter would be ineffective to prevent the slackening of the tape between the idler rollers.

In U.S. Pat. No. 3,797,779, it is proposed that slackening of the tape run which traverses the opening of the cassette housing, for example, as a result of free turning of the tape reels within the cassette housing when the cassette is apart from the magnetic recording and/or reproducing apparatus, be avoided by providing resiliently flexible elements, preferably of plastic, each fixed at one end within the cassette housing and having its other free end engaged with a portion of the tape between a respective one of the tape reels and the tape run for urging the respective tape portion into a relatively tortuous path in which the tape is engaged by a fixed surface, which may be on a guide member, and which imposes an increased resistance to movement of the tape into the tape run, and each resiliently flexible element is deflected in response to tension in the respective engaged tape portion to permit the latter to follow a relatively less tortuous path in which the resistance to movement of the tape is reduced to substantially free the tape for transfer between the reels. However, in the foregoing arrangement, the resiliently flexible elements have substantial areas of contact with the tape even when deflected in response to increased tape tension so that the frictional resistance to movement of the tape is not fully removed and may interfere with the high speed tape movement, particularly during fast-forward or rewind operations of the recording and/or reproducing apparatus. Further, when one or both of the reels is turned and movement of the tape into the run which extends across the access opening is resisted, as aforesaid, there is the possibility that the excess or slack tape between one of the reels and such tape run will become entangled with tape from the other reel.

SUMMARY OF THE INVENTION

Accordingly, it is an object of this invention to provide a tape cassette, as aforesaid, with an improved arrangement for avoiding slackness in the run of the tape extending across an opening of the cassette housing when the cassette is removed from the magnetic recording and/or reproducing apparatus with which it is intended to be used, and in which the tape is substantially freed for transfer between the reels, as during recording, reproducing, fast-forward and rewind operations of such apparatus.

Another object is to provide a tape cassette, as aforesaid, in which the tape is released for free transfer between the reels in response to the existence of tension in the tape between the reels, for example, upon the driving of the tape during recording, reproducing, fast-forward or rewind operations.

Still another object is to provide a tape cassette, as aforesaid, in which the resilient flexibility of the tape, rather than frictional resistance to its movement, is relied upon to avoid slackness in the run of the tape extending across the access opening of the cassette housing, for example, as a result of turning of one or both of the tape reels when the cassette is apart from the recording and/or reproducing apparatus.

A further object is to provide a tape cassette, as aforesaid, in which entangling of the excess or slack tape within the cassette housing is avoided.

A still further object is to ensure that the looseness or slack in the run of the tape extending across the access opening is avoided without producing uneven tension in the tape considered transversely of the tape length.

In accordance with an aspect of this invention, in a tape cassette of the described type having an access opening extending along a side of the cassette housing and through which the tape can be withdrawn for the recording and reproducing of signals thereon and tape guides adjacent the opposite ends of the opening for directing the tape between the tape reels in a path including a run extending along such opening and path portions extending from adjacent the ends of the opening tangentially to the outer turns of the tape wound on the respective reels, at least one tape shifting member acts against a face of the tape in a respective one of the path portions, such tape shifting member being mounted for movement in a course spaced from the adjacent guide and being resiliently urged to a normal position in which the tape shifting member produces a bend in the related path portion between the respective guide and reel so that turning of the respective reel in the tape unwinding direction enlarges the bend due to the resilient flexibility of the tape and transmission to the aforementioned run of the resulting slack in the tape is avoided, and the tape shifting member is deflected from its normal position by the tape in response to a substantial tension in the latter for removing the bend from the respective path portion.

In a preferred embodiment of the invention each tape shifting member acts on the tape in the respective path portion so that the bend thereby formed in the tape between a tape guide and one of the reels is directed away from the other reel, whereby, when the bend is enlarged to avoid slackness of the tape in the run extending across the access opening, entanglement of the enlarged bend with tape from the other reel is avoided.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 5 is a fragmentary sectional view similar to a portion of FIG. 3, but showing another embodiment of the invention;

DETAILED DESCRIPTION OF PREFERRED EMBODIMENTS

Figures 1, 2:
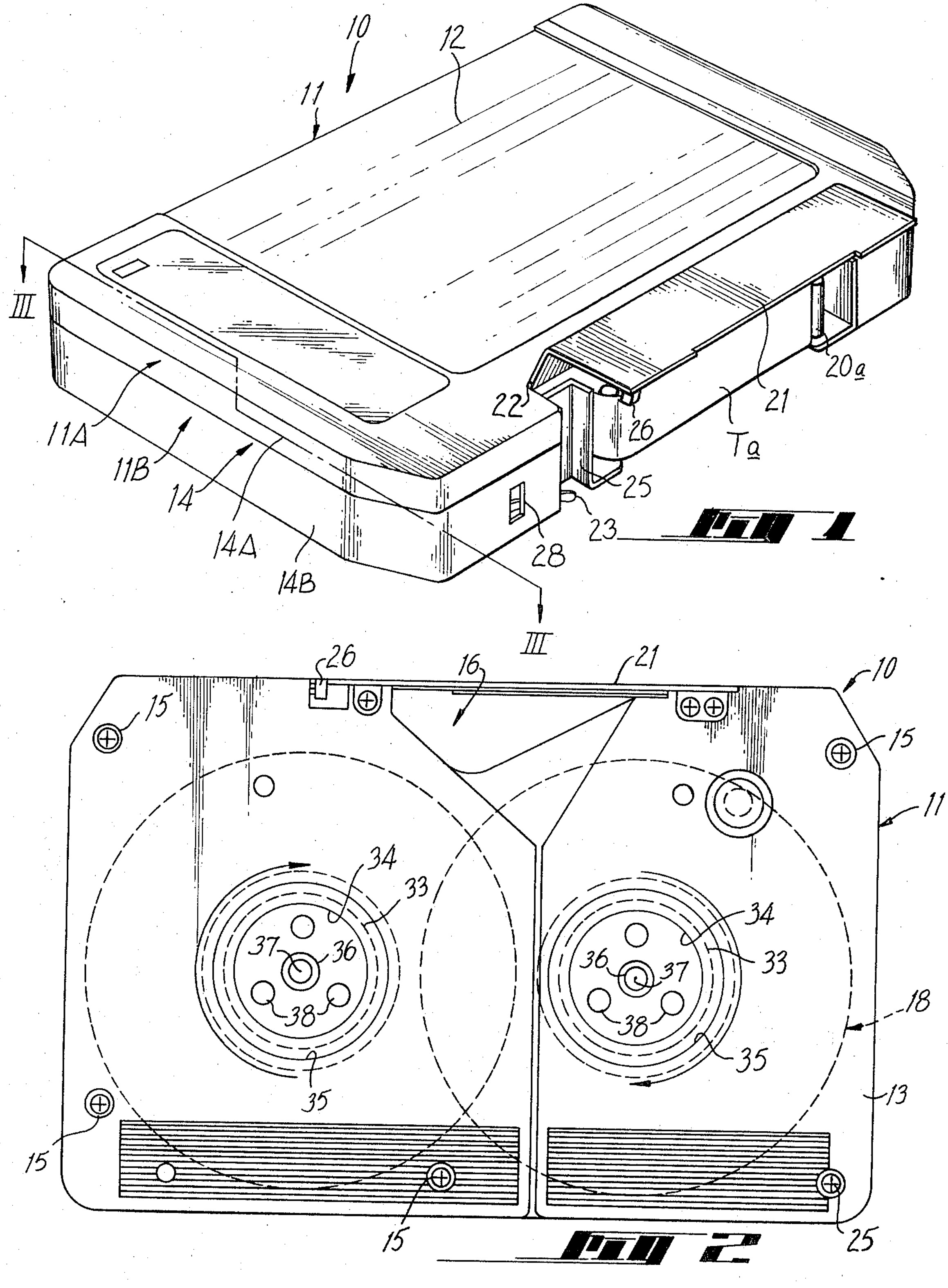
FIG. 1 is a perspective view of a tape cassette in accordance with one embodiment of this invention, and which is shown with its lid opened.
FIG. 2 is a bottom plan view of the tape cassette of FIG. 1, but shown with its lid closed.
Figure 3:
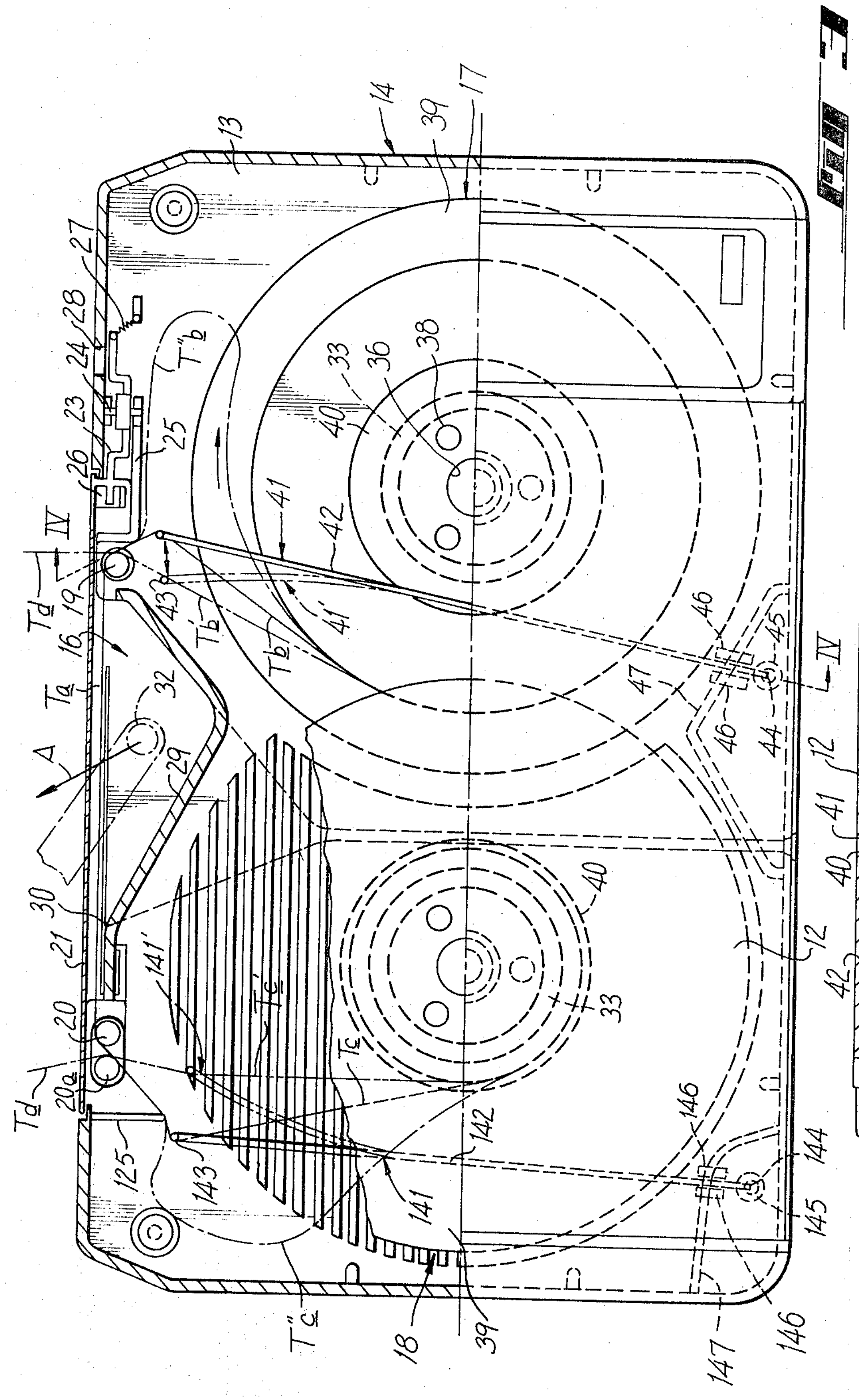
FIG. 3 is a top plan view of the cassette which is shown partly broken away and in section along the line III—III on FIG. 1.

Referring to the drawings in detail and initially to FIG. 1 thereof, it will be seen that the illustrated tape cassette 10 in accordance with this invention comprises a housing 11 of flat, substantially rectangular configuration which may be formed of a suitable plastic and is composed of top and bottom sections 11A and 11B which respectively consist of a top wall 12 and peripheral flange 14A and a bottom wall 13 and peripheral flange 14B. The top and bottom housing sections 11A and 11B are secured together, as by screws 15 (FIG. 2), with flanges 14A and 14B mating to define a peripheral wall 14. The peripheral wall 14 and adjacent portions of top and bottom walls 12 and 13 are cut away along one relatively long side of rectangular housing 11 to define an elongated access opening or cutout 16. Reels 17 and 18 (FIGS. 2 and 3) are suitably located within cassette housing 11 so as to be freely rotatable in side-by-side relation, and a resiliently flexible magnetic tape T is wound on reels 17 and 18 and is guided therebetween by guide pins 19 and 20 located adjacent the opposite ends of opening 16 (FIG. 3). Thus, the tape T is guided in a path that includes a run T*a* extending between guide pins 19 and 20 so as to traverse opening 16, and path portions T*b* and T*c* which respectively extend from guide pin 19 tangentially to the outer turn of the tape wound on reel 17 and from guide pin 20 to the outer turn of the tape wound on reel 18.

A lid 21 (FIG. 1) may be provided for normally closing opening 16 and thereby protecting the tape T contained within cassette housing 11 from exposure to dust and from contact with the operator's fingers during handling of cassette 10. The lid 21 may be pivotally attached to housing 11, as at 22, for swinging between the opened position shown on FIG. 1 and a closed position shown on FIGS. 2 and 3 and in which the lid extends across and substantially closes opening 16. A latching mechanism may be provided for holding lid 21 in its closed condition, with such latching mechanism being released and the lid moved to its opened position upon the installation of cassette 10 in a magnetic recording and/or reproducing apparatus (not shown) with which the cassette is to be used. As shown particularly on FIG. 3, the latching mechanism may include a latch lever 23 pivoted on a shaft 24 which extends between peripheral wall 14 and an angled partition 25 in housing 11 adjacent guide pin 19. One end of latch lever 23 projects beyond the adjacent edge of peripheral wall 14 into opening 16 and is urged downwardly to engage a keeper 26 on lid 21 by means of a spring 27 connected between the other end of lever 23 and an anchor on top wall 12. An aperture 28 is formed in peripheral wall 14 (FIGS. 1 and 3) so that lever 23 extends across such aperture and is rockable to release latch lever 23 from keeper 26 in response to the insertion of an actuating element (not shown) into aperture 28.

Cassette housing 11 may further have a partition 19 extending between top and bottom walls 12 and 13 intermediate guide pins 19 and 20 along the edge of cutout or opening 16 in bottom wall 13 and being disposed inwardly in respect to run T*a* of the magnetic tape extending between guide pins 19 and 20. Preferably, a resiliently flexible plastic strip 30 is anchored at one end, as at 31, to partition 29 and extends along the inner surface of tape run T*a* traversing opening 16 so that the tape between guide pins 19 and 20 cannot bow inwardly toward partition 29.

When cassette 10 is installed in a magnetic recording and/or reproducing apparatus of the kind having an automatic tape loading device, for example, of the type disclosed specifically in U.S. Pat. No. 3,797,779, identified more fully above, a tape engaging member of the automatic loading device is made to extend upwardly within opening or cutout 16 of cassette housing 11 as indicated in broken lines at 32 on FIG. 3, so as to be disposed between partition 29 and strip 30 extending across opening 16. When tape engaging member 32 is thereafter displaced in the direction of the arrow A on FIG. 3, the tape engaging member 32 deflects strip 30 and withdraws the tape between reels 17 and 18 from the cassette housing through opening 16, for example, as indicated in broken lines extending from guide pin 19 and from an additional guide pin 20*a* adjacent guide pin 20, as at T*d* on FIG. 3. Thereafter, the tape loading device, which forms no part of this invention and is not further illustrated or described, may wrap the withdrawn tape about at least a portion of the periphery of a cylindrical guide drum (not shown) for scanning of the thus guided tape by a rotary head or heads associated with the guide drum. However, it will be apparent that, if there is undue looseness or slackness in tape run T*a* traversing opening 16 at the time when cassette 10 is installed in the magnetic recording and/or reproducing apparatus, such tape run T*a* may protrude from opening 15 and become snagged or caught on a part of the apparatus with consequent damage to the tape, or the loose tape run may not be properly engaged by member 32. Accordingly, it is important that the tape in run T*a* be maintained in a substantially taut condition, or at least that substantial looseness or slack in such tape run be avoided, particularly at the time when cassette 10 is being installed in the recording and/or reproducing apparatus with which it is intended to be used.

In the illustrated cassette 10 such undesirable looseness or slack in tape run T*a* can result from turning of one or both of reels 17 and 18 in the tape-unwinding direction when the cassette is apart from the recording and/or reproducing apparatus. As shown on FIGS. 2 and 3, each of reels 17 and 18 includes a cylindrical core or hub 33 which opens downwardly to form a socket 34 registered with a respective opening 35 (FIG. 2) in bottom wall 13 and adapted to receive therethrough a respective reel drive shaft (not shown) when the cassette is installed on the recording and/or reproducing apparatus. The roof of each socket 34 may have a central aperture 36 loosely receiving a respective pin 37 depending integrally from top wall 12 for locating the reel within housing 11. Further, the roof of each socket 34 is shown to have apertures 38 arranged about central aperture 36 and spaced radially from the latter for receiving similarly located coupling pins (not shown) extending from the upper end of the respective reel drive shaft for rotatably coupling the latter with the tape reel. Each of reels 17 and 18 is shown to further include relatively large and small diameter flanges 39 and 40 which are spaced apart on the respective core or hub 33 for the winding of the tape on the latter between such flanges. The reel 17 may have its large and small flanges 39 and 40 at the bottom and top, respectively, of its hub 33, while the other reel 18 has its large and small flanges 39 and 40 at the top and bottom, respectively, of its hub, so that the reels 17 and 18 can be arranged with their large flanges 39 overlapped, as shown, to minimize the distance between the axes of the reels.

It will be apparent that, with the above described arrangement of reels 17 and 18 in housing 11, a person handling the cassette 10 when the latter is apart from a recording and/or reproducing apparatus may reach into openings 35 in bottom wall 13 and manually turn one or both of reels 17 and 18 in the tape-unwinding direction.

In accordance with the present invention, the development of looseness or slackness in tape run T*a* by reason of the free turning of reels 17 and 18 at a time when cassette 10 is apart from the magnetic recording and/or reproducing apparatus is avoided by producing a bend in each of tape path portions T*b* and T*c* between guide pin 19 and reel 17 and between guide pin 20 and reel 18, respectively, when the tape T is not tensioned, so that the turning of the reel 17 or the reel 18 in its tape-unwinding direction merely enlarges such bend due to the resilient flexibility of the tape.

Figure 4:
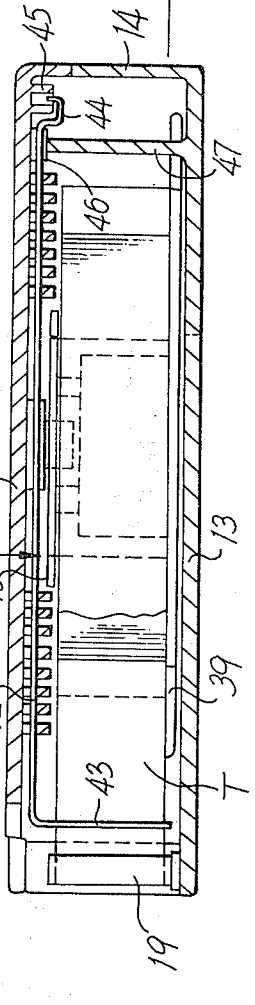
FIG. 4 is a sectional view taken along the line IV—IV on FIG. 3.

More specifically, as shown on FIGS. 3 and 4, in accordance with this invention, a tape shifting member 41 acts against a face of tape T in the direction across path portion T*b*. Such tape shifting member 41 is mounted for movement in a course spaced from the adjacent guide pin 19 and is resiliently urged to the normal position shown in full lines on FIG. 3 and at which tape shifting member 41 produces a bend in path portion T*b* between guide pin 19 and reel 17. Preferably, tape shifting member 41 is arranged so that, when in its normal position, the resulting bend in the tape in path portion T*b* is directed away from the other reel 18, as shown. When there is a substantial tension in tape T, as during the withdrawal of the tape from the cassette to the path T*d* by a tape loading device or during recording, reproducing, fast-forward or rewind operations of an apparatus on which the cassette is installed, the tape tension deflects the tape shifting member, for example, to the position shown in broken lines at 41', and the bend is removed from the respective tape path portion, for example, as indicated at T'*b*.

When tape shifting member 41 is in its normal position to produce the described bend in path portion T*b*, for example, when cassette 10 is apart from a recording and/or reproducing apparatus so that there is no tension in the tape between reels 17 and 18, turning of reel 17 in the tape-unwinding direction, that is, clockwise as viewed on FIG. 3, merely causes enlargement of the bend as indicated at T''*b* by reason of the resilient flexibility of the tape and the tape slackness is taken up in the resulting enlarged bend or loop and is not transmitted to run T*a*. Since the original bend formed in path portion T*b* is directed away from reel 18, the enlarged bend or loop I''*b* also extends from reel 17 in the direction away from reel 18 to avoid possible entangling of the tape in such enlarged bend or loop with tape that may be unwound from reel 18.

Further, as shown, the tape shifting member 41 preferably is disposed so that, when in its normal position, the tape in the bent path portion T*b* between guide pin 19 and tape shifting member 41 is contacted, at the tape face opposed to that engaged by member 41, with a fixed internal portion of housing 11, for example, with the corner of the adjacent angled partition 25. Thus, when the bend is enlarged, as at T''*b*, in response to unwinding of tape from reel 17, the contact of partition 25 with the tape adjacent guide pin 19 ensures that the tape will remain engaged with the surface of guide pin 19 over a substantial angular extent of the latter. The engagement of the corner of partition 25 with the tape further produces a reverse bend at the end of the enlarged bend or loop T''*b* adjacent guide pin 19 and thereby further ensures that the tape slack in such loop will not be transmitted to run T*a*.

As shown, the tape shifting member 41 may be formed of a single length of spring or resilient wire which is bent to provide an elongated resilient arm element 42 which extends parallel to top wall 12 between the latter and reel 17, a tape engaging portion 43 which depends from one end of arm element 42 and an upwardly opening U-shaped end portion 44 at the opposite end of arm element 42 by which tape shifting member 41 is mounted within housing 11. More particularly, as shown, the top wall 12 is formed near its rear margin with a depending hollow boss 45 defining a downwardly opening socket which receives the upwardly directed, free end of U-shaped end portion 44. Further, a pair of parallel, spaced apart projections 46 depend from top wall 12 adjacent boss 45 to define a groove between projections 46 which receives arm element 42 adjacent end portion 44 and thereby holds arm element 42 against turning about boss 45. A generally V-shaped reinforcing partition 47 extends upwardly from bottom wall 13 adjacent the rear margin of the latter between reels 17 and 18, and the top edge of partition 47 engages projections 46 from below and also top wall 12 at opposite sides of projections 46, whereby to retain arm element 42 in the groove between projections 46 (FIGS. 3 and 4).

It will be apparent that the described mounting of tape shifting member 41 disposes the latter in its normal position in which tape engaging portion 43 depending from arm element 42 extends substantially at right angles to the longitudinal median of the tape and engages a face of the latter at only a very small area. When there is tension in the tape, the resilient arm element 42 flexes to dispose the tape shifting member at the position indicated at 41'. By reason of the small area of contact of tape engaging portion 43 with the tape, the frictional resistance of tape shifting member 41 to movement of the tape is minimized and is even further reduced by coating portion 43 with a friction reducing resin, such as, polytetrafluoroethylene. Further, since the tape shifting member 41 is only intended to provide a bend in tape path portion T*b* when there is no tension in the tape, the force with which arm element 42 resiliently resists flexing to the position of the tape shifting member indicated at 41' can be relatively small, whereby to still further reduce the resistance to movement of the tape. The small contact force of tape engaging portion 43 against the tape is to be contrasted with the relatively large contact force that is required when the avoidance of slack in the run T*a* relies upon the application of a frictional braking force, as in the previously mentioned U.S. Patent Application Ser. No. 270,279.

Similarly to the path portion T*b*, the path portion T*c* extending between guide pin 20 and reel 18 is acted upon by a tape shifting member 141. The tape shifting member 141 may be similar to previously described member 41 and is similarly mounted, with the various portions of tape shifting member 141 and of its mounting arrangement being identified by the same reference numerals as were employed in connection with the description of member 41, but with each such reference numeral being preceded by the numeral "1." Thus, the tape shifting member 141 is mounted, at the end 144 of its resilient arm element 142, by means of the hollow boss 145, projections 146 and partition 147 to have the normal position shown in full lines and at which the tape engaging portion 143 acts against the tape between guide pin 20 and reel 18 to deflect or bend the tape into the bent path portion T*c* so long as the tape is not tensioned. The bend of path portion T*c* is shown to be directed away from the other reel 17 so that, upon turning of reel 18 in the tape-unwinding direction, the resulting tape excess or slack merely enlarges the bend or forms a loop, as at T''c, due to the resilient flexibility of the tape and is not transmitted to tape run Ta. Such enlarged bend or loop I''c is shown to be directed away from reel 17 so that the excess or slack tape unwound from reel 18 will not become entangled with excess or slack tape from reel 17. Further, when tape shifting member 141 is in its normal position, the tape between tape engaging portion 143 and guide pin 20 is engaged with a partition 125 at the adjacent end of access opening 16. The side or face of the tape thus engaged by partition 125 is the opposite of that engaged by portion 143 so that, when an enlarged bend or loop T''c is formed, a reverse curvature is imparted to the tape at its contact with partition 125 to maintain engagement of the tape with guide pin 20 and to further ensure that the slack is not transmitted to tape run Ta.

When the tape is under tension, tape shifting member 141 is deflected against the light force of resilient arm element 142 to the position shown in broken lines at 141', with the result that the bend is removed from the respective path portion, as at T'c. Thus, in the cassette 10 according to this invention, unwinding of tape from either or both of reels 17 and 18 when the cassette is apart from a recording and/or reproducing apparatus does not cause slackness or looseness in the tape run Ta. On the other hand, when the cassette 10 is mounted on a magnetic recording and/or reproducing apparatus and tension is applied to the tape, as during recording, reproducing, fast-forward or rewind operations, the tape shifting members 41 and 141 impose little or practically no frictional resistance to the tape movement.

In the embodiment of this invention described above with particular reference to FIGS. 3 and 4, each of the tape shifting members 41 and 141 acts on the tape in the respective path portion Tb or Tc in the same direction in which the tape is to be bent, that is, the tape shifting member 41 or 141 engages the tape at the face of the latter which is concave or at the inside of the bend. However, as shown on FIG. 5 with reference to the tape extending from reel 17 to guide pin 19, but which is obviously equally applicable to the tape extending from reel 18 to guide pin 20 on FIG. 3, a tape shifting member 241 may act against the tape between guide pin 19 and an additional or auxiliary guide pin 19a which is engaged by the tape between reel 17 and guide pin 19. In this case, the depending tape engaging portion 243 at the free end of resilient arm element 242 acts toward the left, as viewed on FIG. 5, on the tape between guide pins 19 and 19a. Thus, when there is no tension in the tape, tape shifting member 241 is in its normal position shown in full lines and the resulting path portion Tb is bent about auxiliary guide pin 19a in the same direction as path portion Tb is bent about tape engaging portion 43 of tape shifting member 41 on FIG. 3. Thus, if reel 17 on FIG. 5 is now turned in the tape-unwinding direction, the resulting excess tape or slack merely enlarges the bend or forms a loop, as at T''b, which is directed away from the other reel 18. When the tape is tensioned, the tape causes the arm element 242 to flex and moves tape shifting member to the position shown at 241'. In such position the contact force of the tape shifting member against the tape is again minimal to impose little or practically no frictional resistance to tape movement.

In the previously described embodiments of this invention, each of the tape shifting members 41, 141 and 241 is engaged with the tape by its portion 43, 143 or 243 depending from the free end of the resilient arm element 42, 142 or 242 which is secured, at its other end, at a level substantially above the longitudinal median of the tape, as is apparent from FIG. 4 with respect to member 41. Thus, as shown schematically on FIG. 6, if tape engaging portion 43 is vertical in the normal position of member 41, that is, when there is no tension in the engaged tape T, the occurrence of tape tension will cause the tape to apply a force F to portion 43 at the longitudinal median of the tape. The force F will cause both horizontal flexing of resilient arm element 42, as appears on FIG. 3, and also torsional flexing of arm element 42 so that the tape engaging portion will be inclined as indicated at 43' on FIG. 6. Such inclination of tape engaging portion 43' will cause an undesirable variation in tape tension across the width of the tape, that is, between the top and bottom edges of the tape.

Accordingly, it is preferable to mount each tape shifting member provided in cassettes according to this invention so that such inclination of its tape engaging portion is avoided. For example, as shown particularly on FIG. 7, a preferred tape shifting member 341 includes an elongated, resilient arm element 342 having a tape engaging portion 343 depending from one end. Extending from the opposite end of arm element 342 is a downwardly offset mounting portion 344 which terminates in an upwardly directed end 344a. The downwardly offset mounting portion 344 is shown to lie substantially in the plane of the longitudinal median or center line CL of the tape T contacted by tape engaging portion 343.

In order to mount the tape shifting member 341 in cassette housing 11, the top section 11A of the latter has an integral projection or boss 345 depending from top wall 12 adjacent the rear margin of the latter. The bottom surface of projection 345 is formed with a downwardly opening groove 346 which receives mounting portion 344 at the level of center line CL of the tape and which communicates with an enlarged recess 347 (FIGS. 7 and 9) loosely receiving the upwardly directed end 344a. A plug 348 (FIGS. 7, 8 and 9) is cemented or otherwise secured in groove 346 below mounting portion 344 to retain the latter in such groove. Therefore, tape shifting member 341 is turnable about the axis of mounting portion 344 which is at the level of the longitudinal median or center line CL of the tape.

Figures 6, 7, 8, 9, 10, 11:
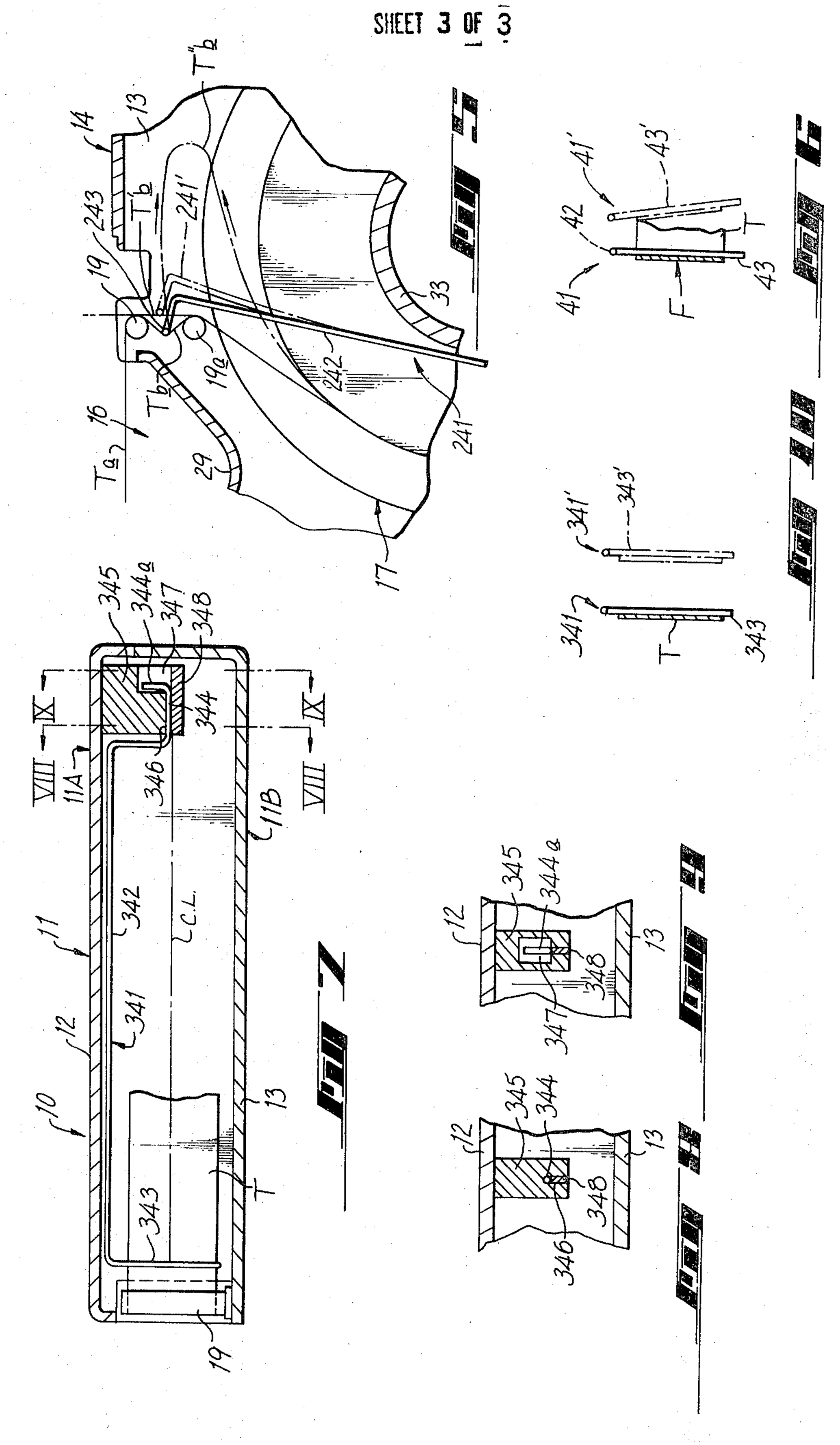
FIG. 6 is a schematic detail view illustrating the movement of a tape shifting member in FIGS. 1–4.
FIG. 7 is a sectional view similar to that of FIG. 4, but showing another embodiment of the invention.
FIGS. 8 and 9 are detail sectional views taken along the line VIII—VIII and the line IX—IX, respectively, on FIG. 7.
FIG. 10 is a view similar to that of FIG. 6, but illustrating the movement of the tape shifting member in the embodiment of FIG. 7.

By reason of the foregoing, when tension in the tape T causes flexing of resilient arm element 342 to displace tape engaging portion 343 from the position shown in full lines on FIG. 10 to the position indicated in broken lines at 343', the attitude of tape engaging portion 343 remains unchanged, that is, portion 343 remains vertical during such movement if the tension in the tape is uniform across the width thereof. On the other hand, if the tape tension is not uniform across the width of the tape, mounting portion 344 of tape shifting member 341 turns in groove 346 and tape engaging portion 343 is inclined from the vertical in the direction for equalizing the tape tension across the tape.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention.

What is claimed is:

1. A cassette for use in a magnetic recording and/or reproducing apparatus, comprising a housing containing rotatable reels on which a resilient flexible tape is wound, said housing having an access opening extending along a side thereof and through which said tape can be withdrawn from said housing for the recording and reproducing of signals thereon, guide means within said housing adjacent the opposite ends of said opening for directing the tape between said reels in a path including a run extending along said opening and path portions extending from adjacent said ends of said opening tangentially to the outer turns of said tape wound on the respective reels, and at least one tape shifting means acting against a face of said tape in a region of a respective one of said path portions between the outer turn on the respective reel and the proximal side of said housing adjacent the access opening, said tape shifting means being mounted for movement in a course between the respective reel and the adjacent guide means and being resiliently urged generally tangentially of the outer turn thereon to a normal position in which said tape shifting means produces a bend in said one path portion between the respective guide means and reel, the concave surface of the bend facing generally toward the other reel so that turning of said respective reel in the direction for unwinding the tape therefrom enlarges said bend in a direction away from the other reel due to the resilient flexibility of said tape and transmission to said run of the resulting slack in the tape is avoided, said tape shifting means being deflected from said normal position by said tape in response to a substantial tension in the latter for removing said bend from the respective path portion.

2. A cassette according to claim 1; in which there is a tape shifting means, as aforesaid, associated with each of said path portions of the tape.

3. A cassette according to claim 1; in which said housing includes top and bottom walls between which said reels are rotatable about respective axes perpendicular to said walls, said tape shifting means includes a tape engaging portion extending substantially at right angles to the longitudinal median of the tape, and an elongated, resilient arm element lying in a plane parallel to said longitudinal median of the tape and having said tape engaging portion extending from one end of said elongated element; and in which means are provided for mounting the other end portion of said elongated resilient arm element in said housing so that said course of movement is the loci traced by said tape engaging portion during flexing of said elongated resilient arm element about said other end portion thereof, said elongated resilient arm element extending between said respective reel and one of said walls, and said other end portion being offset relative to the remainder of said elongated resilient arm element so as to lie substantially in the plane of said longitudinal median of the tape.

4. A cassette according to claim 3; in which said means for mounting said offset other end portion comprises a groove, said offset other end portion comprising a straight section extending longitudinally along the bottom of said groove, and means holding said straight section in said groove, said tape shifting means being turnable in said groove about the longitudinal axis of said straight section so that said tape engaging portion assumes an attitude for equalizing the tension in the tape across the width of the latter when said tape shifting means is deflected from said normal position.

5. A cassette according to claim 3; in which said tape engaging portion and elongated arm element are integral parts of a length of resilient wire.

6. A cassette according to claim 1; in which said housing includes a fixed internal portion disposed adjacent said respective guide means and against which the other face of said tape in said one path portion is contacted between said respective guide means and said tape shifting means when the latter produces said bend in said one path portion.

7. A cassette according to claim 1; in which an additional tape guiding member engages the tape in said one path portion between said respective guiding means and reel, said tape shifting means acts against the tape between said respective guiding means and said additional guiding member and, when in said normal position, said tape shifting means forms said bend in the tape about said adidtional tape guiding member.

* * * * *